UNITED STATES PATENT OFFICE.

HIRAM S. UTLEY, OF CHICAGO, ILLINOIS, ASSIGNOR OF ONE-HALF TO HENRY S. BOWEN, OF SAME PLACE.

METHOD OF PRODUCING IMITATION STONE.

SPECIFICATION forming part of Letters Patent No. 336,675, dated February 23, 1886.

Application filed April 29, 1885. Serial No. 163,892. (Specimens.)

*To all whom it may concern:*

Be it known that I, HIRAM S. UTLEY, a citizen of the United States, residing in Chicago, county of Cook, and State of Illinois, have invented certain new and useful Improvements in Methods of Producing Imitation Stone, of which the following is a specification.

This invention relates to improvements in producing imitation stone by the application of granulated substances in connection with varnish to one side of a plate or other form of glass, so as to give the artificial stone a polished appearance and adapt it for various uses.

The object of this invention is to produce an imitation stone of polished appearance, and of varying and natural tints or shades, by the employment of naturally or artificially tinted marbles or stone in connection with white or tinted varnish applied to one side of glass.

In carrying out the invention the granules of marble or stone are preferably assorted in size by bolting, so that after applying the larger size of granules smaller ones may be used to fill the interstices occurring between the larger ones to a degree that will result in producing the fineness and closeness of grain appearing in the genuine stone it is desired to imitate. After applying a coating of varnish to the glass, and before said varnish is dry, the coarsest granules of marble or stone to be used are sprinkled or spread over the glass. Then the next smaller in size, and so on until finally, if necessary, very finely-granulated stone or powdered marble may be used. When the granulated substances have been properly applied, a coating of varnish or several coatings, if necessary, are spread over the whole and allowed to dry; or, if found desirable, a thin coat of varnish may be spread over each grade of granules, as applied.

In some instances, after one or more of the coarser grades of granules have been applied upon the varnished glass, a second coat of varnish of any tint to produce the desired effect may be applied in connection with or without the finest granulated or powdered marble or stone, and as many coatings of tinted varnish may be used as are found necessary to produce the best effect.

To produce variations in this imitation of stone or marble it is preferred to employ granules which naturally present the desired variations in tint or color; but it would be within this invention to produce said tints by artificial means, and particularly in marble which is of such nature as to readily take up and hold coloring matters.

In some reductions to practice which I have made the glass has first applied to one side a coating of white varnish, on which, while raw, was first sprinkled coarse granules of white, red, green, black, and two shades of brown marble of natural tints, and then a next finer grade of granules of white, red, green, yellow, and two shades of brown marbles of natural tints, and then a very fine grade of white, red, green, yellow, black, and two shades of brown marble of natural tints, and next over all a coating of varnish lightly tinted with pink coloring-matter, and, finally, over all two or three coats of varnish after the tinted varnish had been allowed to dry. A close inspection of the products so made show that there is sufficient irregularity in applying the granules, which, in connection with the tinted varnish, furnish the veins natural to marbles having a similar appearance. These veins are produced by an irregular sprinkling of the granules upon the varnished glass, and are more fully brought out by the subsequent application of the tinted varnish.

The veins may be varied at will with the same tint and grade of granules above set forth, and the general tint of the entire surface and appearance of the article may likewise be varied by employing a different tint than a pink tint of varnish.

The invention involved is therefore not limited to the special tints or orders or kinds of tints of granules or varnish set forth in connection with the specimen, for said specimen is merely offered as an exhibit to demonstrate the utility of the invention herein disclosed.

In United States Letters Patent No. 315,188, granted me April 7, 1885, I have described and claimed the coating of glass with varnish, on which is sprinkled, while raw, granulated porcelain, over which is spread a coating of colored varnish, with or without first having added granulated slate; but this is obviously a different process from what is herein claimed.

Having described my invention, what I claim, and desire to secure by Letters Patent, is—

1. The herein-described method of producing imitation stone, the same consisting in first coating glass with varnish, then sprinkling on said varnish, while more or less raw, granulated marble naturally or artificially varying in tint, and then applying over the whole one or more coats of varnish.

2. The herein-described method of producing an imitation stone, the same consisting in first coating glass with varnish, and then sprinkling on said varnish, while more or less raw, marble granulated to different degrees and of varying natural or artificial tints, and then applying one or more coats of tinted varnish over the same.

3. The herein-described method of producing imitation stone, the same consisting in first coating glass with varnish, then sprinkling on said varnish, while more or less raw, granulated marble and other stone, the granules of which are of differing size, and then applying over the same one or more coats of white or tinted varnish.

HIRAM S. UTLEY.

Witnesses:
W. W. ELLIOTT,
JNO. G. ELLIOTT.